(12) United States Patent
Chen

(10) Patent No.: US 11,825,067 B2
(45) Date of Patent: Nov. 21, 2023

(54) NAKED-EYE STEREOSCOPIC DISPLAY SYSTEM AND DISPLAY METHOD THEREOF

(71) Applicant: Au Optronics Corporation, Hsinchu (TW)

(72) Inventor: Ya-Ting Chen, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 17/829,378

(22) Filed: Jun. 1, 2022

(65) Prior Publication Data

US 2023/0262206 A1    Aug. 17, 2023

(30) Foreign Application Priority Data

Feb. 16, 2022    (TW) .................................. 111105587

(51) Int. Cl.
*H04N 13/307*    (2018.01)

(52) U.S. Cl.
CPC ................................. *H04N 13/307* (2018.05)

(58) Field of Classification Search
CPC .. H04N 13/302; H04N 13/307; H04N 13/317; H04N 13/324; H04N 13/327; H04N 13/00; H04N 2213/006
USPC .......................................................... 348/51
See application file for complete search history.

(56) References Cited

U.S. PATENT DOCUMENTS

| 5,663,831 | A | 9/1997 | Mashitani et al. |
| 9,436,014 | B2 | 9/2016 | Kroon et al. |
| 9,832,457 | B2 | 11/2017 | Kim et al. |
| 2008/0055228 | A1 | 3/2008 | Glen |
| 2014/0111854 | A1 | 4/2014 | Kroon et al. |
| 2015/0015681 | A1 | 1/2015 | Kim et al. |
| 2017/0150131 | A1 | 5/2017 | Van Putten et al. |
| 2019/0104299 | A1* | 4/2019 | Yuuki ................. H04N 13/376 |
| 2022/0166965 | A1* | 5/2022 | Chu .................... H04N 13/324 |

FOREIGN PATENT DOCUMENTS

| CN | 202815324 | | 3/2013 |
| CN | 103609107 | | 6/2016 |
| CN | 104094596 | | 6/2016 |
| CN | 112929757 | A * | 6/2021 |
| CN | 113467137 | A * | 10/2021 |
| CN | 113687523 | A * | 11/2021 |
| EP | 3287834 | A1 * | 2/2018 |

(Continued)

*Primary Examiner* — Behrooz M Senfi
(74) *Attorney, Agent, or Firm* — JCIPRNET

(57) ABSTRACT

A naked-eye stereoscopic display system including a display, an optical element, and a controller is provided. The display is adapted to emit a plurality of image beams, and includes a plurality of display regions. Each of the display regions includes a plurality of first sub-display regions and a second sub-display region. A light configuration is performed on the image beams by the optical element, and then the image beams are projected out of the naked-eye stereoscopic display. The controller is electrically connected with the display. The controller controls the display, so that a light intensity of an image beam generated by the first sub-display regions is lower than a light intensity of an image beam generated by the second sub-display region. A display method of the naked-eye stereoscopic display is also provided.

16 Claims, 3 Drawing Sheets

(56) References Cited

FOREIGN PATENT DOCUMENTS

| | | | |
|---|---|---|---|
| JP | H07287195 | | 10/1995 |
| JP | 5943273 | * | 5/2016 |
| JP | 5943273 B2 | * | 7/2016 |
| WO | WO-2022193360 A1 | * | 9/2022 |

* cited by examiner

NAKED-EYE STEREOSCOPIC DISPLAY SYSTEM AND DISPLAY METHOD THEREOF

CROSS-REFERENCE TO RELATED APPLICATION

This application claims the priority benefit of Taiwan application serial no. 111105587, filed on Feb. 16, 2022. The entirety of the above-mentioned patent application is hereby incorporated by reference herein and made a part of this specification.

BACKGROUND OF THE INVENTION

Field of the Invention

The invention relates to a display system and a display method thereof, and in particular, to a naked-eye stereoscopic display system and a display method thereof.

Description of Related Art

In recent years, the concept of display panel research and development is directed towards a "natural vision" stereoscopic display system, that is, a naked-eye stereoscopic display system. Naked-eye stereoscopic display systems have various applications in the market, such as smart medical display systems such as telesurgery. Medical applications require good image quality. However, the naked-eye stereoscopic display system currently on the market has the issue of image crosstalk, so that the presented images may not be detailed enough.

SUMMARY OF THE INVENTION

The invention provides a naked-eye stereoscopic display system and a display method thereof that may effectively reduce the issue of crosstalk.

An embodiment of the invention provides a naked-eye stereoscopic display including a display system, an optical element, and a controller. The display is adapted to emit a plurality of image beams, and includes a plurality of display regions. Each of the display regions includes a plurality of first sub-display regions and a second sub-display region. A light configuration is performed on the image beams by the optical element, and then the image beams are projected out of the naked-eye stereoscopic display. The controller is electrically connected with the display. The controller controls the display, so that a light intensity of an image beam generated by the first sub-display regions is lower than a light intensity of an image beam generated by the second sub-display region.

An embodiment of the invention provides a display method of a naked-eye stereoscopic display system that includes the following steps. A plurality of image beams are emitted using a display, wherein the display includes a plurality of display regions, and each of the display regions includes a plurality of first sub-display regions and a second sub-display region. The controller controls the display, so that a light intensity of an image beam generated by the first sub-display regions is lower than a light intensity of an image beam generated by the second sub-display region.

Based on the above, in the naked-eye stereoscopic display system or the display method thereof of an embodiment of the invention, since the light intensity of the image beam generated by the first sub-display regions is smaller than the light intensity of the image beam generated by the second sub-display region, the issue of crosstalk between the edges of the display regions is effectively alleviated, so that the naked-eye stereoscopic display system or the display method thereof may provide stereoscopic images of better quality.

DESCRIPTION OF THE EMBODIMENTS

Figure 1:
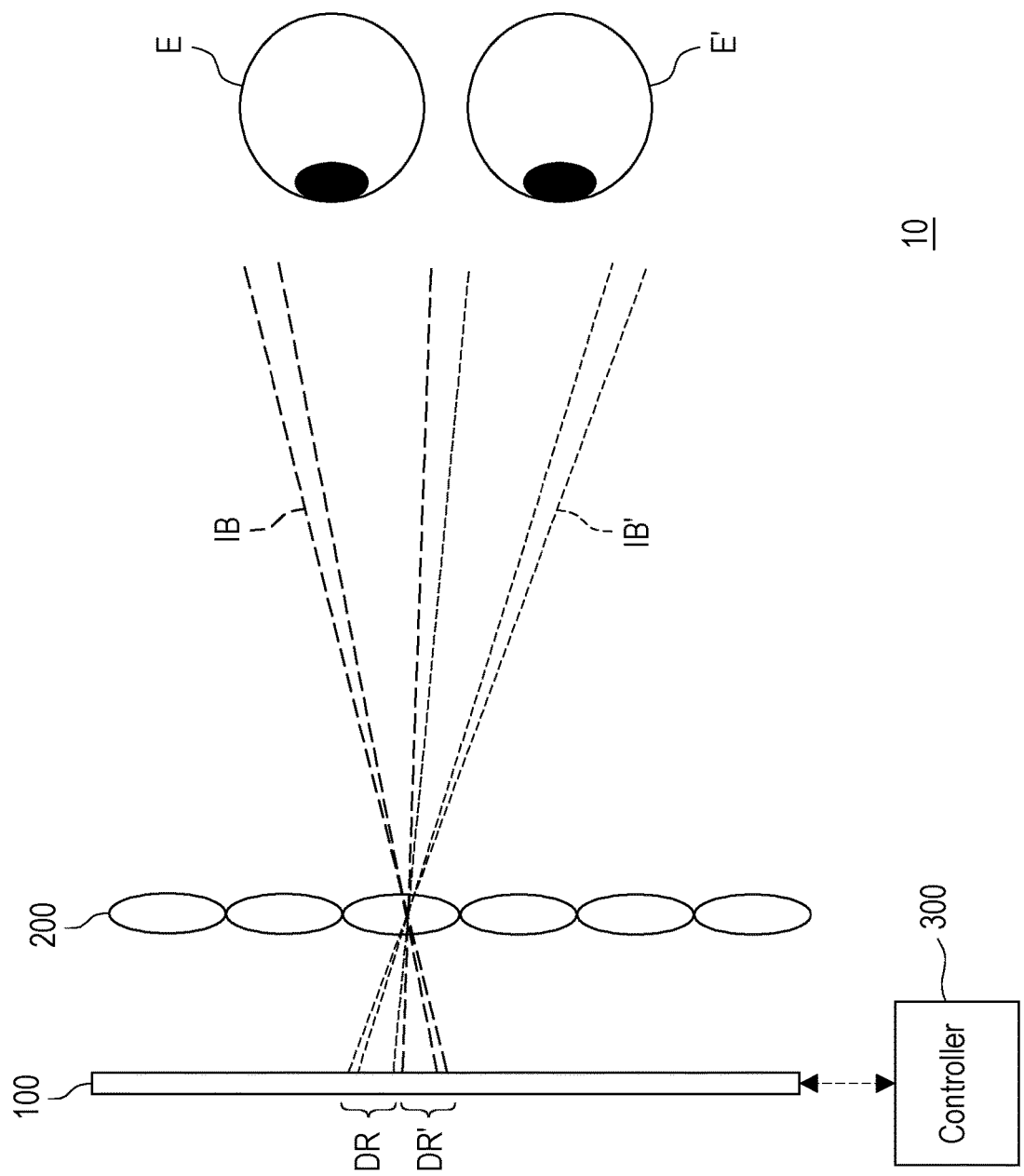
FIG. 1 is a schematic diagram of a naked-eye stereoscopic display system according to an embodiment of the invention.

FIG. 1 is a schematic diagram of a naked-eye stereoscopic display system according to an embodiment of the invention. Referring to FIG. 1, an embodiment of the invention provides a naked-eye stereoscopic display system 10 including a display 100, an optical element 200, and a controller 300. In the present embodiment, the display 100 is, for example, a thin-film transistor liquid-crystal display (TFT-LCD) or an organic light-emitting diode (OLED) display, but the invention is not limited thereto. The display 100 is adapted to emit a plurality of image beams IB and IB', and includes a plurality of display regions DR and DR'. In particular, the image beams IB and IB' may be red beams, green beams, blue beams, or other color beams, or a combination thereof. Moreover, the distance between the centers of the image beams IB and IB', under the optimal viewing distance (OVD) of the system design, is approximately equal to the interpupillary distance (IPD) of the viewer, that is, the distance between the centers of eyes E and E'.

In the present embodiment, the image beams IB and IB' pass through the optical element 200 and then are projected out of the naked-eye stereoscopic display system 10 and transmitted to the eyes E and E' of the viewer. In FIG. 1, the image beams IB and IB' emitted by the adjacent display regions DR' and DR correspond to one of the eyes E and E' of the viewer respectively. In particular, there is a difference in image information with parallax between the image beams IB and IB', so that the viewer may produce stereoscopic vision after receiving the image beams IB and IB'.

In an embodiment, the optical element 200 may be a microlens array or a parallax barrier, wherein FIG. 1 illustrates that the optical element 200 is a microlens array. When the optical element 200 is selected as a microlens array, the image beams IB and IB' are transmitted to the eyes E and E' respectively via different refraction angles of the microlenses. In particular, each microlens in the microlens array is, for example, a cylindrical microlens. When the optical element 200 is selected as the parallax barrier, the parallax barrier enables the eyes E and E' to see only the image beams IB and IB' from the display regions DR' and DR, respectively.

Figure 2:
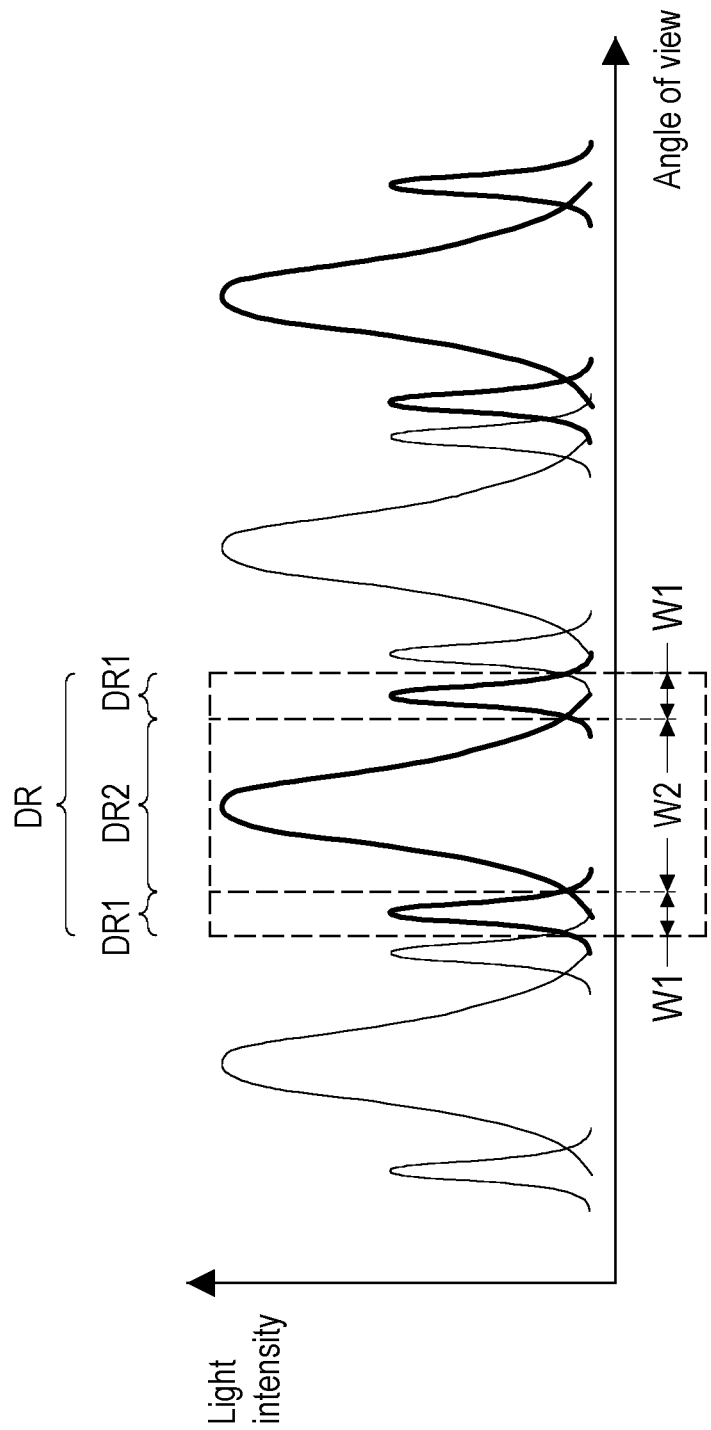
FIG. 2 is a schematic diagram of light intensities in first sub-display regions and a second sub-display region of a naked-eye stereoscopic display system relative to angle of view according to an embodiment of the invention.

FIG. 2 is a schematic diagram of light intensities in first sub-display regions and a second sub-display region of a naked-eye stereoscopic display system relative to angle of view according to an embodiment of the invention. Please refer to FIG. 1 and FIG. 2 at the same time. In the present embodiment, each of the display regions DR includes a plurality of first sub-display regions DR1 and a second sub-display region DR2. The controller 300 is electrically connected with the display 100. The controller 300 controls the display 100, so that the light intensity of the image beam IB' generated by the first sub-display regions DR1 is lower than the light intensity of the image beam IB generated by the second sub-display region DR2.

In the present embodiment, the first sub-display regions DR1 are located at the periphery of the second sub-display region DR2, the second sub-display region DR2 is located at the center region of each of the display regions DR, and a width W1 of the first sub-display regions DR1 is smaller than a width W2 of the second sub-display region DR2. In particular, the number of the first sub-display regions DR1 is an even number.

In addition, when the number of the first sub-display regions DR1 is larger, the effect of the naked-eye stereoscopic display system 10 in alleviating the crosstalk issue is better, but the computational burden of the controller 300 is also increased. Therefore, in a preferred embodiment, the number of the first sub-display regions DR1 falls within the range of 1 to 5. Alternatively, the ratio between the width W2 of the second sub-display region DR2 and the width W1 of the first sub-display regions DR1 falls within the range of 1.0 to 10.

In an embodiment, the controller 300 includes, for example, a central processing unit (CPU), a microprocessor, a digital signal processor (DSP), a programmable controller, a programmable logic, a programmable logic device (PLD), other similar devices, or a combination of these devices, and the invention is not limited thereto. Moreover, in an embodiment, each function of the controller 300 may be implemented as a plurality of program codes. These program codes are stored in one memory unit, and the program codes are executed by the controller 300. Alternatively, in an embodiment, each function of the controller 300 may be implemented as one or a plurality of circuits. The invention does not limit whether each function of the controller 300 is implemented in software or hardware form.

Based on the above, in an embodiment of the invention, the display 100 of the naked-eye stereoscopic display system 10 includes the plurality of display regions DR and DR'. Each of the display regions DR includes the plurality of first sub-display regions DR1 and the second sub-display region DR2. In particular, the controller 300 controls the display 100, so that the light intensity of the image beam IB' generated by the first sub-display regions DR1 is lower than the light intensity of the image beam IB generated by the second sub-display region DR2. Therefore, the issue of crosstalk between the edges of the display regions DR and DR' is effectively alleviated, so that the stereoscopic image quality of the naked-eye stereoscopic display system 10 is better.

Figure 3:
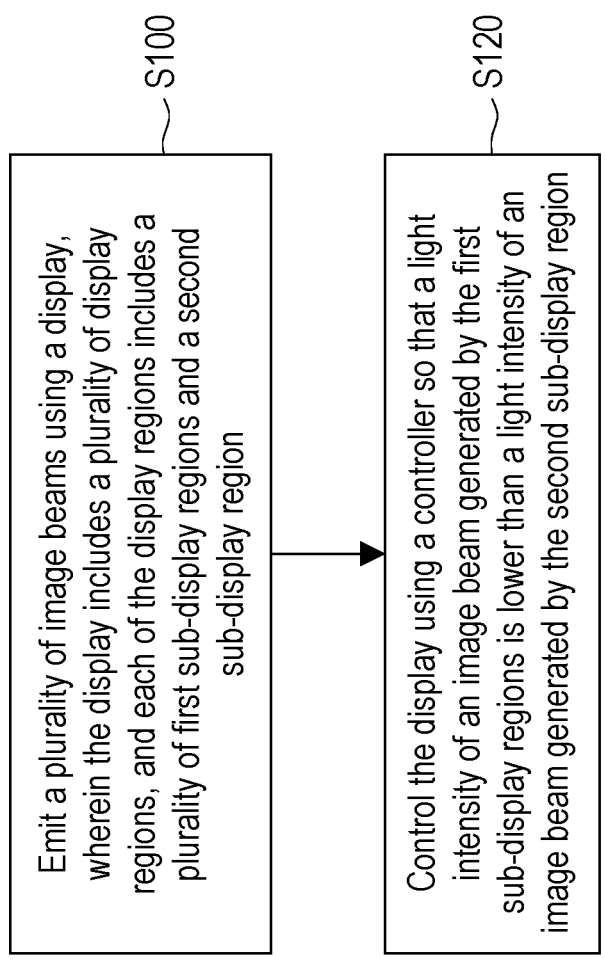
FIG. 3 is a flowchart of a display method of a naked-eye stereoscopic display system according to an embodiment of the invention.

FIG. 3 is a flowchart of a display method of a naked-eye stereoscopic display system according to an embodiment of the invention. Referring to FIG. 3, an embodiment of the invention provides a display method of a naked-eye stereoscopic display system that includes the following steps. In step S100, the display 100 is used to emit a plurality of image beams IB' and IB. In step S120, the controller 300 controls the display 100, so that the light intensity of the image beam IB' generated by the first sub-display regions DR1 is lower than the light intensity of the image beam IB generated by the second sub-display region DR2.

Based on the above, in the naked-eye stereoscopic display system or the display method thereof according to an embodiment of the invention, the display includes a plurality of display regions. Each of the display regions includes a plurality of first sub-display regions and a second sub-display region. Since the light intensity of the image beam generated by the first sub-display regions is smaller than the light intensity of the image beam generated by the second sub-display region, the issue of crosstalk between the edges of the display regions is effectively alleviated, so that the naked-eye stereoscopic display system or the display method thereof may provide stereoscopic images of better quality.

What is claimed is:

1. A naked-eye stereoscopic display system, comprising:
a display suitable for emitting a plurality of image beams, and comprising a plurality of display regions, wherein each of the display regions comprises a plurality of first sub-display regions and a second sub-display region;
an optical element, wherein a light configuration is performed on the image beams by the optical element, and then the image beams are projected out of the naked-eye stereoscopic display system; and
a controller electrically connected with the display, wherein the controller controls the display, so that a light intensity of an image beam generated by the first sub-display regions is lower than a light intensity of an image beam generated by the second sub-display region.

2. The naked-eye stereoscopic display system of claim 1, wherein the first sub-display regions are located at a periphery of the second sub-display region.

3. The naked-eye stereoscopic display system of claim 1, wherein the second sub-display region is located at a center region of each of the display regions.

4. The naked-eye stereoscopic display system of claim 1, wherein a number of the first sub-display regions is an even number.

5. The naked-eye stereoscopic display system of claim 1, wherein a width of the first sub-display regions is smaller than a width of the second sub-display region.

6. The naked-eye stereoscopic display system of claim 1, wherein a ratio between a width of the second sub-display region and a width of the first sub-display regions falls within a range of 1.0 to 10.

7. The naked-eye stereoscopic display system of claim 1, wherein a number of the first sub-display regions falls within a range of 1 to 5.

8. The naked-eye stereoscopic display system of claim 1, wherein the optical element is a microlens array.

9. A display method of a naked-eye stereoscopic display, comprising:
emitting a plurality of image beams using a display, wherein the display comprises a plurality of display regions, and each of the display regions comprises a plurality of first sub-display regions and a second sub-display region; and
controlling the display using a controller, so that a light intensity of an image beam generated by the first sub-display regions is lower than a light intensity of an image beam generated by the second sub-display region.

10. The display method of the naked-eye stereoscopic display system of claim 9, wherein the first sub-display regions are located at a periphery of the second sub-display region.

11. The display method of the naked-eye stereoscopic display system of claim 9, wherein the second sub-display region is located at a center region of each of the display regions.

12. The display method of the naked-eye stereoscopic display system of claim 9, wherein a number of the first sub-display regions is an even number.

13. The display method of the naked-eye stereoscopic display system of claim 9, wherein a width of the first sub-display regions is smaller than a width of the second sub-display region.

14. The display method of the naked-eye stereoscopic display system of claim 9, wherein a ratio between a width of the second sub-display region and a width of the first sub-display regions falls within a range of 1.0 to 10.

15. The display method of the naked-eye stereoscopic display system of claim 9, wherein a number of the first sub-display regions falls within a range of 1 to 5.

16. The display method of the naked-eye stereoscopic display system of claim 9, wherein the optical element is a microlens array.

\* \* \* \* \*